(12) United States Patent
Lucas et al.

(10) Patent No.: US 11,373,129 B2
(45) Date of Patent: *Jun. 28, 2022

(54) SYSTEM FOR AUTOMATED RESOURCE SET MULTI-FACTOR RISK ANALYSIS

(71) Applicant: Hartford Fire Insurance Company, Hartford, CT (US)

(72) Inventors: Theodore J Lucas, San Francisco, CA (US); Dariusz Wojnar, Moraga, CA (US); Mark D Thomas, Corte Madera, CA (US); Scott M Fitzpatrick, San Francisco, CA (US); Kylie J Baker, San Francisco, CA (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/983,464

(22) Filed: Aug. 3, 2020

(65) Prior Publication Data

US 2020/0364637 A1  Nov. 19, 2020

Related U.S. Application Data

(63) Continuation of application No. 15/651,208, filed on Jul. 17, 2017.

(51) Int. Cl.
*G06Q 10/06* (2012.01)
*G06Q 40/06* (2012.01)
*G06Q 40/04* (2012.01)

(52) U.S. Cl.
CPC ......... *G06Q 10/0635* (2013.01); *G06Q 40/04* (2013.01); *G06Q 40/06* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 6,078,904 A | * | 6/2000 | Rebane | G06Q 40/06 705/36 R |
| 7,937,316 B2 | * | 5/2011 | Friedman | G06Q 40/06 705/37 |
| 8,131,632 B2 | * | 3/2012 | Friedman | G06Q 40/04 705/37 |

(Continued)

*Primary Examiner* — Alan S Miller
(74) *Attorney, Agent, or Firm* — Buckley, Maschoff & Talwalkar LLC

(57) ABSTRACT

A multi-factor risk analysis system may include a resource data store defining, for each of a plurality of resources: a resource identifier, a current resource value, and a resource type. A back-end application computer server may establish a set of risk parameter diversification objectives and determine a set of eligible resources by accessing the resource data store. The server may then calculate a value factor characteristic and a momentum factor characteristic for each of the eligible resources. A set of index resources may be constructed from the set of eligible resources based on the risk parameter diversification objective and a risk optimization process utilizing a weighted value factor characteristic and momentum factor characteristic of each resource. An interactive user interface may then be rendered including indications associated with the constructed set of index resources, the value factor characteristics, and the momentum factor characteristics.

20 Claims, 14 Drawing Sheets

(56) References Cited

U.S. PATENT DOCUMENTS

| | | | | |
|---|---|---|---|---|
| 8,335,710 | B2* | 12/2012 | Pennay | G06Q 30/0201 |
| | | | | 705/347 |
| 8,533,089 | B1* | 9/2013 | Renshaw | G06Q 40/06 |
| | | | | 705/36 R |
| 8,548,884 | B2* | 10/2013 | Meucci | G06Q 40/06 |
| | | | | 705/35 |
| 8,626,631 | B2* | 1/2014 | Tompkins | G06Q 40/06 |
| | | | | 705/36 R |
| 2006/0161489 | A1* | 7/2006 | Allen | G06Q 40/00 |
| | | | | 705/35 |
| 2007/0271196 | A1* | 11/2007 | Blitzer | G06Q 40/00 |
| | | | | 705/36 R |
| 2009/0112774 | A1* | 4/2009 | Meucci | G06Q 40/00 |
| | | | | 705/36 R |
| 2010/0174664 | A1* | 7/2010 | Kelly | G06Q 40/00 |
| | | | | 705/37 |
| 2011/0196777 | A1* | 8/2011 | Friedman | G06Q 40/04 |
| | | | | 705/37 |
| 2011/0295766 | A1* | 12/2011 | Tompkins | G06Q 40/06 |
| | | | | 705/36 R |
| 2012/0278254 | A1* | 11/2012 | Rosenthal | G06Q 40/06 |
| | | | | 705/36 R |
| 2013/0332391 | A1* | 12/2013 | Renshaw | G06Q 40/06 |
| | | | | 705/36 R |

* cited by examiner

400 ⬎

| When the sum (Σ) of all company weights within a country (i) reaches a threshold: | Then the maximum allocation to that country will equal its representation in the market capitalization-weighted universe plus... |
|---|---|
| $\sum_{country} weight_i > 20\%$ | -2% |
| $15\% < \sum_{country} weight_i \leq 20\%$ | 6% |
| $10\% < \sum_{country} weight_i \leq 15\%$ | 4% |
| $\sum_{country} weight_i \leq 15\%$ | 2% |

410 ⬏

| When the sum (Σ) of all company weights within a country (i) reaches a threshold: | Then the minimum allocation to that country will equal its representation in the market capitalization-weighted universe minus... |
|---|---|
| $\sum_{country} weight_i > 20\%$ | 10% |
| $15\% < \sum_{country} weight_i \leq 20\%$ | 3% |
| $\sum_{country} weight_i \leq 15\%$ | 1% |

| RESOURCE IDENTIFIER 1302 | CURRENT MARKET VALUE 1304 | TYPE 1306 | COUNTRY 1308 | VALUE FACTOR 1310 | MOMENTUM FACTOR 1312 | QUALITY FACTOR 1314 |
|---|---|---|---|---|---|---|
| R_1001 | $215 | RETAIL | TURKEY | 0.747 | 0.234 | 0.654 |
| R_1002 | $100 | CONSTRUCTION | USA | 0.123 | 0.385 | 0.987 |
| R_1003 | $120 | SERVICE | JAPAN | 0.876 | 0.212 | 0.500 |
| R_1004 | $50 | RETAIL | CHINA | 0.900 | 0.782 | 0.101 |
| R_1005 | $95 | MANUFACTURING | JAPAN | 0.555 | 0.153 | 0.464 |

SYSTEM FOR AUTOMATED RESOURCE SET MULTI-FACTOR RISK ANALYSIS

CROSS-REFERENCE TO RELATED APPLICATIONS

The present application is a continuation of U.S. patent application Ser. No. 15/651,208 entitled "SYSTEM FOR AUTOMATED RESOURCE SET MULTI-FACTOR RISK ANALYSIS" and filed Jul. 17, 2017. The entire content of that application is incorporated herein by reference.

BACKGROUND

In some cases, an enterprise might want to select an index of resources from a plurality of resources of various types. Moreover, different types of resources might be associated with different current values and/or different levels of risk. By selecting appropriate resources, and allocating value to those resources, the future performance of the index of resources may be expected to behave in a desirable fashion. Manually selecting resources and/or allocating value to those resources can be a time consuming and error prone process—especially when there are a substantial number of potential resources and/or a substantial number of resources to be considered. By way of example only, the resources being considered by an enterprise might comprise equities or similar assets. In this case, risk, specifically how and where it is allocated, can have a substantial impact on whether an investment achieves its goals. For example, emerging-markets strategies that hew closely to a market-capitalization-weighted benchmark index might introduce a variety of risk distortions and other missed opportunities that may be unrecognized by the enterprise.

It would therefore be desirable to provide systems and methods to automatically facilitate a multi-factor risk analysis for a set of resources in an automated, efficient, and accurate manner.

SUMMARY OF THE INVENTION

According to some embodiments, systems, methods, apparatus, computer program code and means are provided to facilitate a multi-factor risk analysis for a set of resources in an automated, efficient, and accurate manner. In some embodiments, a multi-factor risk analysis system may include a resource data store defining, for each of a plurality of resources: a resource identifier, a current resource value, and a resource type. A back-end application computer server may establish a set of risk parameter diversification objectives and determine a set of eligible resources by accessing the resource data store. The server may then calculate a value factor characteristic and a momentum factor characteristic for each of the eligible resources. A set of index resources may be constructed from the set of eligible resources based on the risk parameter diversification objective and a risk optimization process utilizing a weighted value factor characteristic and momentum factor characteristic of each resource. An interactive user interface may then be rendered including indications associated with the constructed set of index resources, the value factor characteristics, and the momentum factor characteristics.

Some embodiments comprise: means for establishing a set of risk parameter diversification objectives; means for determining a set of eligible resources by accessing a resource data store containing electronic records defining, for each of a plurality of resources: a resource identifier associated with an entity, a current resource value, and a resource type; means for calculating a value factor characteristic for each of the eligible resources; means for calculating a momentum factor characteristic for each of the eligible resources; means for automatically constructing a set of index resources from the set of eligible resources based on the risk parameter diversification objective and a risk optimization process utilizing a weighted value factor characteristic and momentum factor characteristic of each resource; and means for exchanging information with a remote user device to render an interactive user interface including indications associated with the constructed set of index resources, the value factor characteristics, and the momentum factor characteristics.

In some embodiments, a communication interface associated with a back-end application computer server exchanges information with one or more remote user devices. The information may be exchanged, for example, via public and/or proprietary communication networks.

Technical effects of some embodiments of the invention are improved and computerized ways to facilitate a multi-factor risk analysis for a set of resources in an automated, efficient, and accurate manner. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 4 provides some examples of risk strategy control rules according to some embodiments.

FIG. 13 is a portion of a resource database in accordance with some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of information processing by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks, and subsystems. For example, in some embodiments the present invention may directly exchange information with a remote user device and/or back-end application computer server in an automated and efficient manner, thus improving the overall performance of the system associated with an enterprise (e.g., by reducing the amount of communication required between parties and reducing errors). Moreover, embodiments associated with automatic multi-factor risk analysis processes might further improve communication network performance, user interactions (e.g., by increasing the accuracy of an automatically determined set of index resources), etc. Moreover, embodiments may improve user communications for an enterprise by coordinating messages to and from a remote user device (e.g., by automatically supplying current and correct information to the remote user device). Still further, embodiments may simplify a user's understanding of allocations and/or facilitate adjustments to such allocations via interactive graphical user interfaces.

A user may be interested in selecting an index of resources from a plurality of resources of various types. Moreover, different types of resources might be associated with different current values and/or different levels of risk. By selecting appropriate resources, and allocating value to those resources, the future performance of the index of resources may be expected to behave in a desirable fashion.

Figure 1:
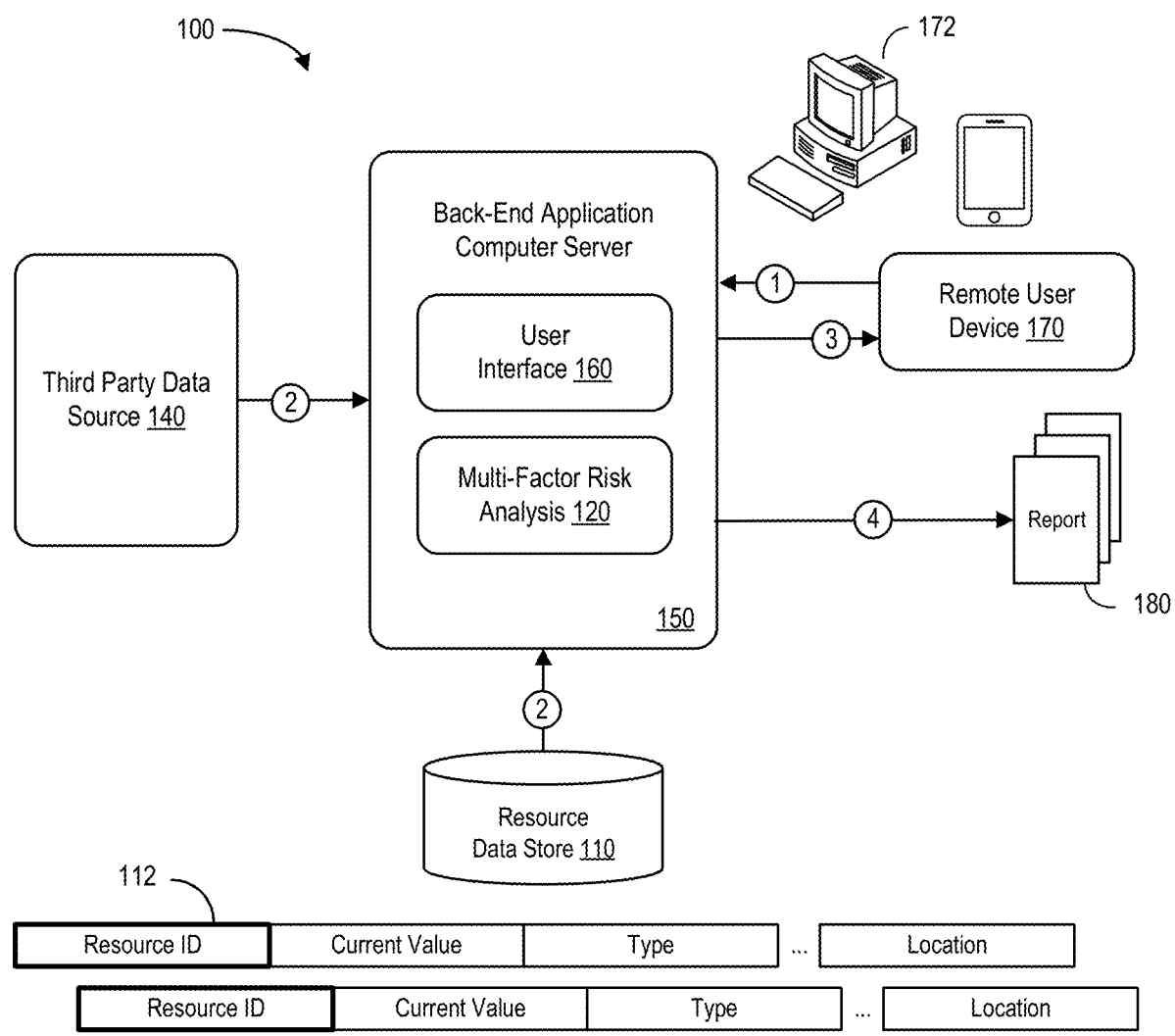
FIG. 1 is a high-level block diagram of a system according to some embodiments.

Manually selecting resources and/or allocating value to those resources can be a time consuming and error prone process—especially when there are a substantial number of potential resources and/or a substantial number of resources to be considered. It would therefore be desirable to provide systems and methods to facilitate a multi-factor risk analysis for a set of resources in an automated, efficient, and accurate manner. FIG. 1 is a high-level block diagram of a system 100 according to some embodiments of the present invention. In particular, the system 100 includes a back-end application computer server 150 that may access information in a resource data store 110 (e.g., storing a set of electronic records 112 including a resource identifier, current value, type, location, etc.). The back-end application computer server 150 may also exchange information with remote user devices 170 (e.g., via a firewall). According to some embodiments, a user interface 160 of the back-end application computer server 150 may communicate with the user devices 170 (e.g., smartphones, tablet computers, desktop computers 172), access information in the resource data store 110 and/or from a third party data source 140, and facilitate the presentation of interactive user interface displays to a user. Note that the back-end application computer server 150 might also be associated with a third party, such as a vendor that performs a service for an enterprise.

The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may automatically facilitate the presentation of interactive user interface displays. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the resource data store 110. The resource data store 110 may contain data that was downloaded and/or that was originally input by employees of an enterprise. The resource data store 110 may be locally stored or reside remote from the back-end application computer server 150. As will be described further below, the resource data store 110 may be used by the back-end application computer server 150 and/or a multi-factor risk analysis 120 to automatically construct a set of index resources. Although a single back-end application computer server 150 is shown in FIG. 1, any number of such devices may be included. Moreover, various devices described herein might be combined according to embodiments of the present invention. For example, in some embodiments, the back-end application computer server 150 and resource data store 110 might be co-located and/or may comprise a single apparatus.

According to some embodiments, the system 100 may automatically construct a set of index resources via one or more interactive user interface displays. For example, at (1) a remote user device 170 might transmit a request for a set of index resources to the back-end application computer server 150. The back-end application computer server 150 may then receive information from the resource data store 110 and/or a third party data store 140 (e.g., associated with a third party service that provides current market information about equities) at (2). The multi-factor risk analysis 120 may then construct the set of index resources and transmit an indication associated with the set to the remote user device 170 at (3). According to some embodiments, the back-end application computer server 150 might also generate one or more reports 180 (e.g., for investors) at (4). According to some embodiments, the information associated with such reports 180 may be provided and/or adjusted via interactive graphical user interface displays (e.g. as described with respect to FIGS. 6 through 11).

According to some embodiments, a set of index resources might be designed to capture the performance potential of targeted resource (e.g., asset) classes by deliberately allocating away from risks and towards opportunities more likely to enhance return potential. The indices may be constructed via an integrated process that seeks to improve diversification across countries, currencies, sectors, and/or companies while capturing the potential performance benefits of certain common factors, such as value, momentum, and quality. A rules-based, proprietary methodology may employ a multi-layered risk-controlled approach that seeks to de-concentrate country, sector, and/or size risks relative to capitalization-weighted universes while selecting companies exhibiting favorable risk premia factors. While different index methodologies described herein may follow generally similar approaches, each might be designed to address the risks and opportunities inherent to each asset class or equity region. Thus, there may be distinctions between the various approaches. By way of example only, embodiments may exercise control over final index content by restricting the eligible securities for a particular index from universes composed of companies within the following general parameters:

A Developed Markets Index might include companies that represent economic coverage up to a pre-determined limit of the market capitalization of specific countries within developed Europe, Australasia, North America, Japan, etc.

A United States ("US") Equity Index might include the largest pre-determined number companies domiciled in the US by market capitalization.

An Emerging Markets Index might include countries with economic development levels considered by most institutions to be "emerging" (e.g., based on the level of economic development, growth, fiscal considerations, market breadth, foreign investment restrictions, and other criteria).

A Global Small Cap Index might include smaller companies with market capitalizations within a pre-determined range of values.

A Real Estate Investment Trust ("REIT") Index might include securities with greater than a pre-determined amount of market capitalization.

Thus, some embodiments may facilitate a multi-factor risk analysis for a set of resources in an automated, efficient, and accurate manner.

Figure 2:
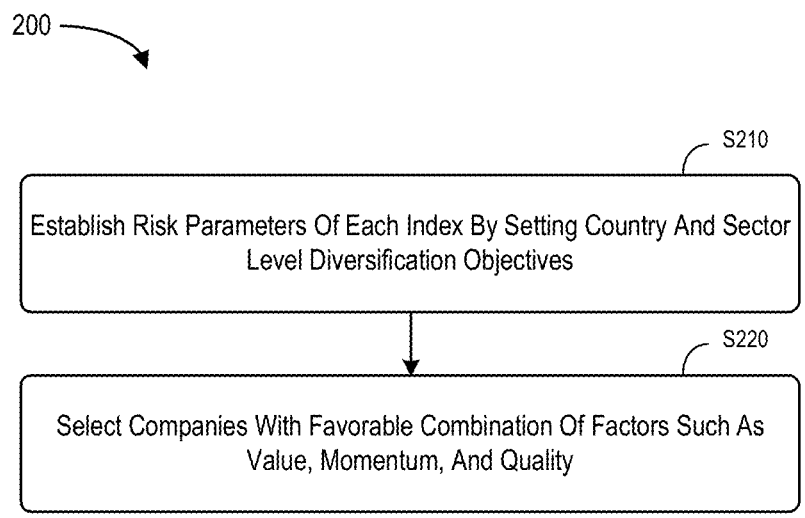
FIG. 2 illustrates an index construction method according to some embodiments of the present invention.

Note that the system 100 of FIG. 1 is provided only as an example, and embodiments may be associated with additional elements or components. According to some embodiments, the elements of the system 100 automatically support interactive user interface displays over a distributed communication network. For example, FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system might establish risk parameters of each index by setting country and/or sector level diversification objectives. That is, index construction might expand an opportunity set and tend to drive capital allocation deeper into the eligible universe. When applicable, certain indices may include volatility targets as part of the index design. At S220, multi-factor security selection may select companies with a favorable combination of factors such as value, momentum, and quality. The methodologies may seek companies exhibiting multiple favorable factors—a design feature that may enhance return potential and reduce risk.

According to some embodiments, an initial composition of an index, as well as any on-going adjustment, might be based on one or more of the following rules:
Country Eligibility;
Universe Candidate Equity Securities; and
Establishing Index Constituents.

With respect to country eligibility, the eligible universe of developed markets and/or countries might be determined periodically, based on, for example: a market size (e.g., market capitalization as percent of Gross Domestic Product ("GDP"); country total market capitalization; market capitalization as a percent of world; a size of economy (GDP, country GDP as percent of world GDP); a level of development (GDP per capita); a country's restrictions on foreign capital investment; institutional feedback from the international investment community regarding economic development levels; and/or market accessibility.

With respect to the equity universe, stocks might be selected that meet a criteria for inclusion in the universe. Unlike the country selection process, stock selection rules might be applied at a different periodic rate (e.g., at each rebalance period). The stocks included in the index might pass the following screening criteria:

The company might need to be domiciled in one of the countries included in the index. Country of domicile classifications are assigned by applying at least one of the following criteria (in order of priority): the country of incorporation, and the country of primary exchange listing.

According to some embodiments, Master Limited Partnerships ("MLPs") might be excluded.

The stock is in the top pre-determined percentage of the developed market equity universe's market capitalization might be included.

The Average Daily Trading Volume ("ADTV") over the last pre-determined period of time might need to exceed a pre-determined value.

Figure 3:
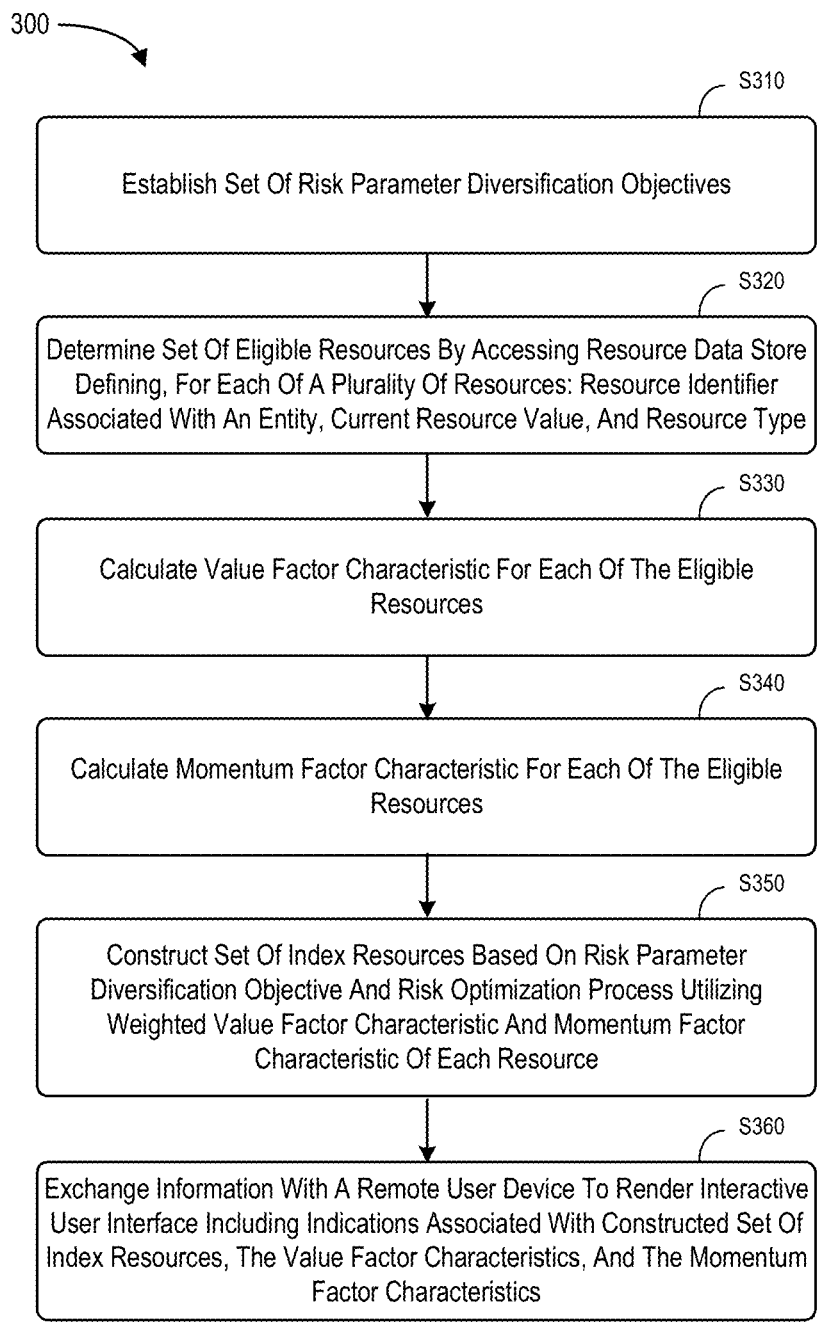
FIG. 3 illustrates a method in accordance with some embodiments.

With respect to establishing the index constituents, upon determination of the stocks to be included in the universe, an optimization process may be applied to determine which stocks are held and how they are weighted. FIG. 3 illustrates a method 300 in accordance with some embodiments. At S310, the system may establish a set of risk parameter diversification objectives. At S320, the system may determine a set of eligible resources by accessing a resource data store containing electronic records defining, for each of a plurality of resources: a resource identifier associated with an entity, a current resource value, and a resource type. At S330, the system may calculate a value factor characteristic for each of the eligible resources. At S340, the system may calculate a momentum factor characteristic for each of the eligible resources. At S350, the system may automatically construct a set of index resources from the set of eligible resources based on the risk parameter diversification objective and a risk optimization process utilizing a weighted value factor characteristic and momentum factor characteristic of each resource. At S360, the system may exchange information with a remote user device to render an interactive user interface including indications associated with the constructed set of index resources, the value factor characteristics, and the momentum factor characteristics.

According to some embodiments, the index may include multi-layered risk controls, including:
size and liquidity caps on positions;
minimum effective number of equities must exceed a pre-determined number;
the system may seek up to pre-determined percentage reduction in volatility (based on historical standard deviation);
large cap stocks (defined as stocks with market cap over a pre-determined value) must not be less than a percentage of the total index;

smaller companies (defined as companies below a predetermined threshold) must be no more than a predetermined percentage of the total index;

active sector allocation limitations are set at a pre-determined percentage from each sector's representation in an initial capitalization-weighted universe; and active country allocation limitations range between predetermined percentages from each country's representation in an initial capitalization-weighted universe according to sample rules 410, 420 provided by the illustration 400 of FIG. 4.

Some embodiments may seek to identify and allocate capital to stocks with attractive factor characteristics. For example, factors covering the dimensions of value, momentum and quality might be utilized and stocks might be selected with an aim to enhance the overall factor characteristics of the index (while also meeting the strategy risk controls previously described).

For example, a first weight might be applied to a value factor mix that weighs multiple valuation metrics to arrive at an aggregated valuation metric (e.g., earnings yield, Earnings Before Interest, Tax, Depreciation and Amortization ("EBITDA")/Enterprise Value ("EV"), operating cash flow/EV, revenue/EV, dividend yield, book value, etc.) A second weight might be application to a momentum factor mix that weights multiple price momentum metrics to arrive at an aggregated momentum metric (e.g., the last ten monthly returns, the last five monthly returns, etc.). A third weight might be application to a quality metric factor associated with gross profitability/total assets. Where the quality metric factor is not available (e.g., for financial and real estate stocks), the quality metric factor might be excluded from the overall factor mix. The system may then create aggregated factor scores (once the valuation, momentum and quality scores have been calculated) to create a single aggregated score for each stock. With these inputs in place, the index may be constructed using an optimization process. The optimization may use the initial starting universe of eligible securities as the baseline and the optimization objectives and constraints may determine the composition of the index during each reconstitution and rebalance period. A process layer may determine a suitable combination of stocks that allows for the greatest expression of index objectives, including factor expression (e.g., the combined aggregated scores for all stocks), diversification goals and/or volatility targets. According to some embodiments, the optimization process further seeks to mitigate unnecessary and counter-productive turnover while maintaining index attributes and other risk controls.

Figure 5:
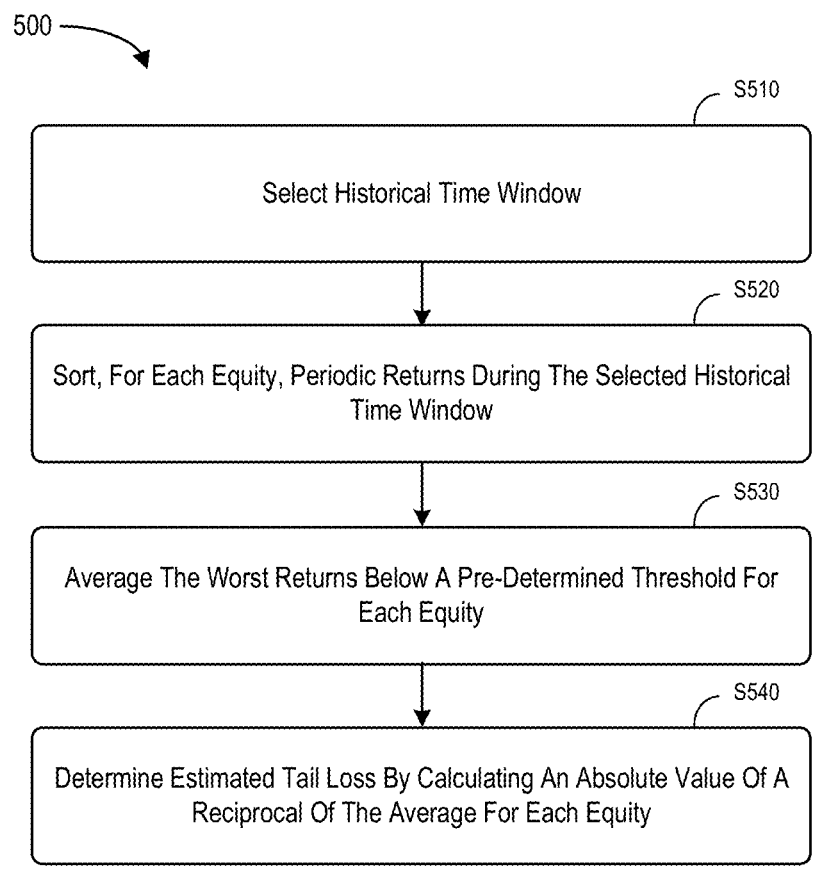
FIG. 5 illustrates an estimated tail loss risk parity method in accordance with some embodiments.

Risk parity refers to a technique whereby assets or asset groups are weighted in inverse proportion to risk. For example, standard deviation or variance might be used to measure risk. FIG. 5 illustrates an Estimated Tail Loss ("ETL") risk parity method 500 that averages more extreme historically observed losses. At S510, a historical time window may be selected. For example, 50 or 100 months might be selected. At S520, the system may sort, for each equity, periodic returns during the selected historical time window. For example, 50 or 100 monthly returns might be sorted from best to worst. The system might then select a pre-determined threshold value (e.g., the worst ten percent for 100 samples would be worst ten monthly returns). At S530, the system may average the worst returns below the pre-determined threshold for each asset or asset group. At S540, the system may determine the ETL by calculating an absolute value of the reciprocal of the average for each asset or asset group. According to some embodiments, the system may then re-scale to sum to 100%.

According to some embodiments, a risk optimization process is associated with a linear optimization process with an added constraint requiring a minimum number of effective equity holdings, wherein the effective number of holdings is calculated as a Herfindahl index variation representing the inverse of a sum of squared weights. That is, in an otherwise standard linear optimization process, a constraint may be added requiring a minimum number of "effective" holdings. Effective holdings might be calculated, for example, as the inverse of the sum of squared weights. Such an approach is sometimes referred to as a Herfindahl index or a variation on it.

According to some embodiments, a risk optimization process may be associated with a linear optimization process with an added constraint associated with a targeted maximum estimated portfolio volatility relative to a reference benchmark index and/or a market segment performance. An estimated portfolio volatility may then be calculated via a covariance matrix based on returns of portfolio holdings and a relationship of those returns to each other. The covariance matrix may be reduced from a size equal to the square of assets in the portfolio to a smaller size. For example, in an otherwise standard linear optimization process, a constraint may be added requiring a targeted maximum estimated portfolio volatility relative to a reference benchmark index or market segment performance. The calculation of estimated portfolio volatility may require a covariance matrix based on returns of portfolio holdings and the relationship of those returns to each other. In order to perform the calculation, the covariance matrix might need to be "well behaved" and have a sound structure. This might be facilitated by "shrinking" the matrix from a size equal to the square of assets in the portfolio to a substantially smaller size. The technique employed might be, for example, based on the Ledoit and Wolf technique.

According to some embodiments, a set of risk parameter diversification objectives might be associated with portfolio risk, cost risk, structural risk, market risk, liquidity risk, and/or tax risk. Moreover, calculation of a target risk for a portfolio might be associated with an average of value at risk, volatility, estimated tail loss, and/or stress testing. In some embodiments, an estimated tail loss calculation uses a bootstrap Monte Carlo estimation to draw historical samples to achieve a distribution of worst case scenarios. That is, rather than simply calculating the average of worst returns below a threshold, this technique may employ a methodology based on bootstrap Monte Carlo estimation to draw, for example, tens of thousands of samples from history to achieve a distribution of worst case scenarios. The estimates of tail loss generated in this manner might, for example, rely on the central limit theorem to produce a better behaved, more robust estimates of tail loss. Although the technique may be defined specifically, its applications might be wide and varied. For example, a risk optimized advancing markets separately managed account ("SMA") might utilize the approach in a risk parity framework whereby country weights are allocated in inverse proportion. In effect, countries with a higher estimated risk receive lower allocations while countries with lower estimated risk receive higher allocations.

According to some embodiments, multi-asset solutions tax loss harvesting algorithms may also be utilized. For example, an automated back-end application computer server might execute a portfolio management and tax loss harvesting process.

According to some embodiments, an interactive user interface may include information about: portfolio offensive characteristic, portfolio defensive characteristics, risk and return characteristics, and/or hypothetical risk and return characteristics. For example, the interactive user interface might include, for each of a benchmark set of resources, a first portfolio set of resources, and a second portfolio set of resources, a tabular presentation of weighted average portfolio characteristics, country and sector diversification, and/or a full period summary. Moreover, the interactive user interface might further include a graphical presentation of: combined factor score of holdings, a factor strength and balance, company diversification, portfolio risk metrics, periodic portfolio return relative to benchmark, upside/downside capture, periodic portfolio hypothetical return relative to benchmark, hypothetical upside/downside capture, etc.

Figure 6:
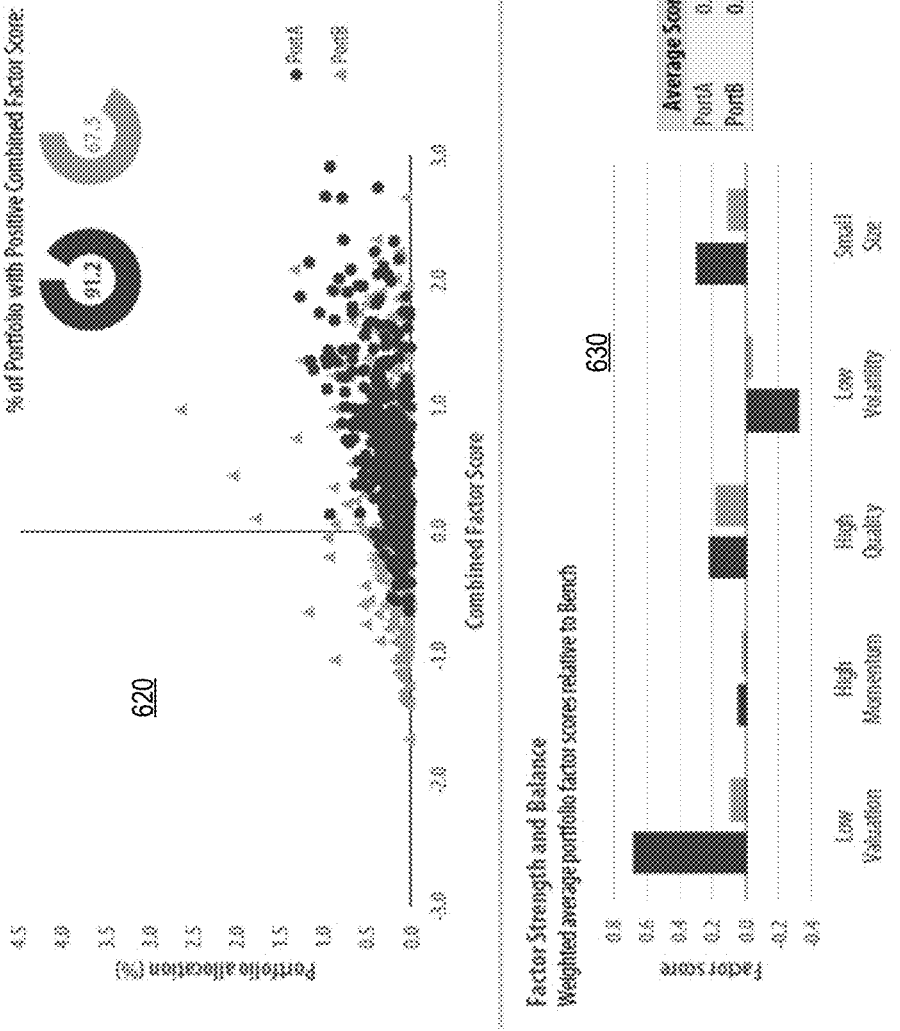
FIG. 6 is an example of a portfolio offensive characteristics display according to some embodiments.

Some example displays will now be described in connection with FIGS. 6 through 9. In particular, FIG. 6 is an example of a portfolio offensive characteristics display 600 according to some embodiments. The display 600 illustrates holdings-based risk premia exposures including tabular weighted average portfolio characteristics 610 (e.g., price-to-earnings valuation, momentum data, quality data, etc.) along with graphical presentations of combined factor score of holdings data 620 and factor strength and balance data 630. Note that metrics shown in italics on the left side of the display 600 might not be explicitly used in the valuation, momentum, or quality scores shown on the right side of the display 600. Moreover, the combined factor score 620 might represent a score for each company based on a blend of valuation, momentum, and quality scores.

Figure 7:
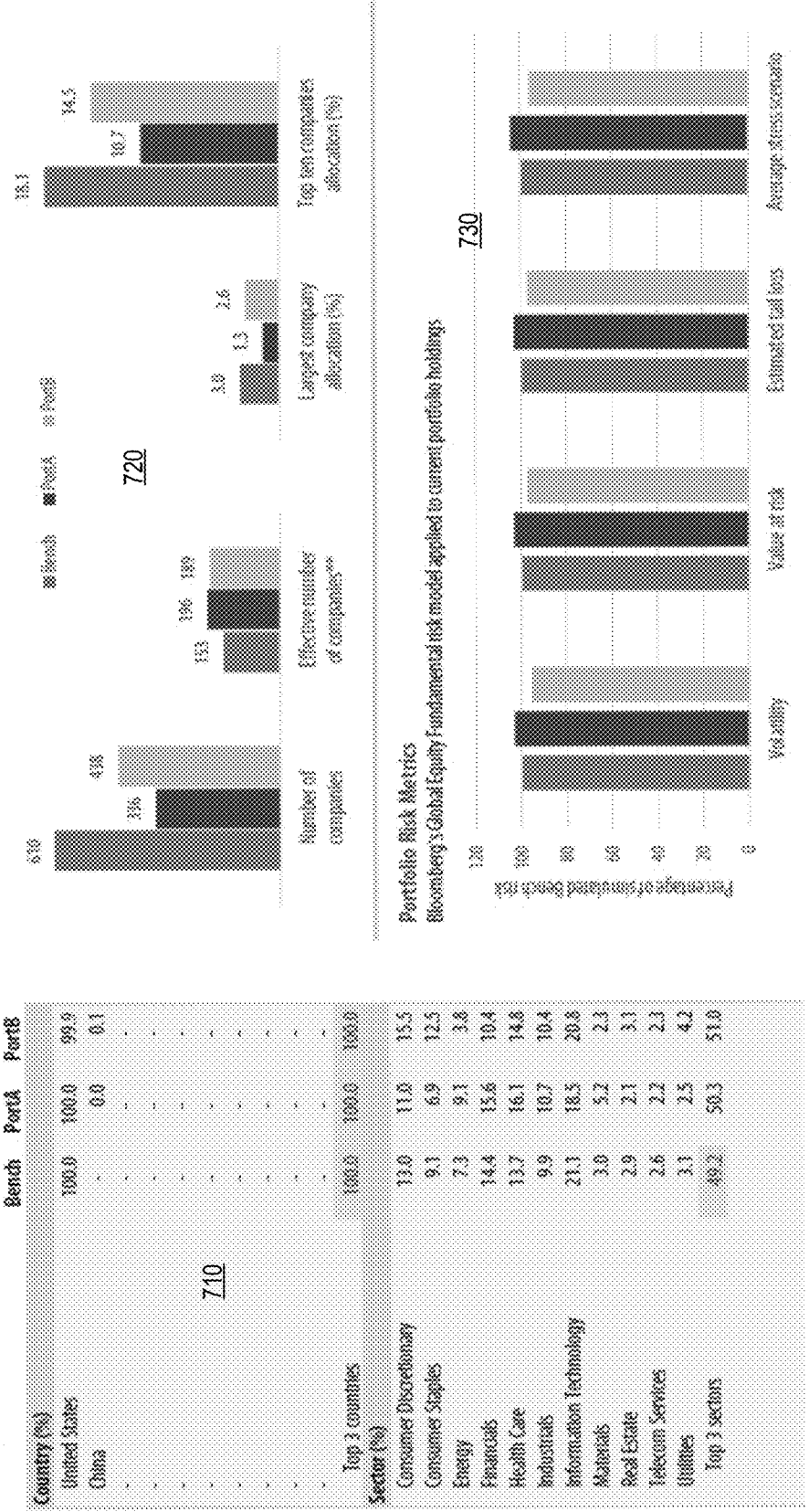
FIG. 7 is an example of a portfolio defensive characteristics display in accordance with some embodiments.

FIG. 7 is an example of a portfolio defensive characteristics display 700 in accordance with some embodiments. The display 700 illustrates holdings-based diversification and risk metrics including tabular country and sector diversification 710 (e.g., consumer discretionary sector, energy sector, real estate sector, etc.) along with graphical presentations of company diversification data 720 and portfolio risk metrics data 730. Note that the countries shown 710 might represent a pre-determined number of countries with the largest bench weight. Moreover, cash and non-equity securities might be removed and each portfolio might be re-scaled to sum to 100%. Note that the effective number of companies might represent a measure of portfolio concentration in which a higher number indicates a more diversified portfolio, measured as the reciprocal of the Herfindahl index or the sum of weights squared.

Figure 8:
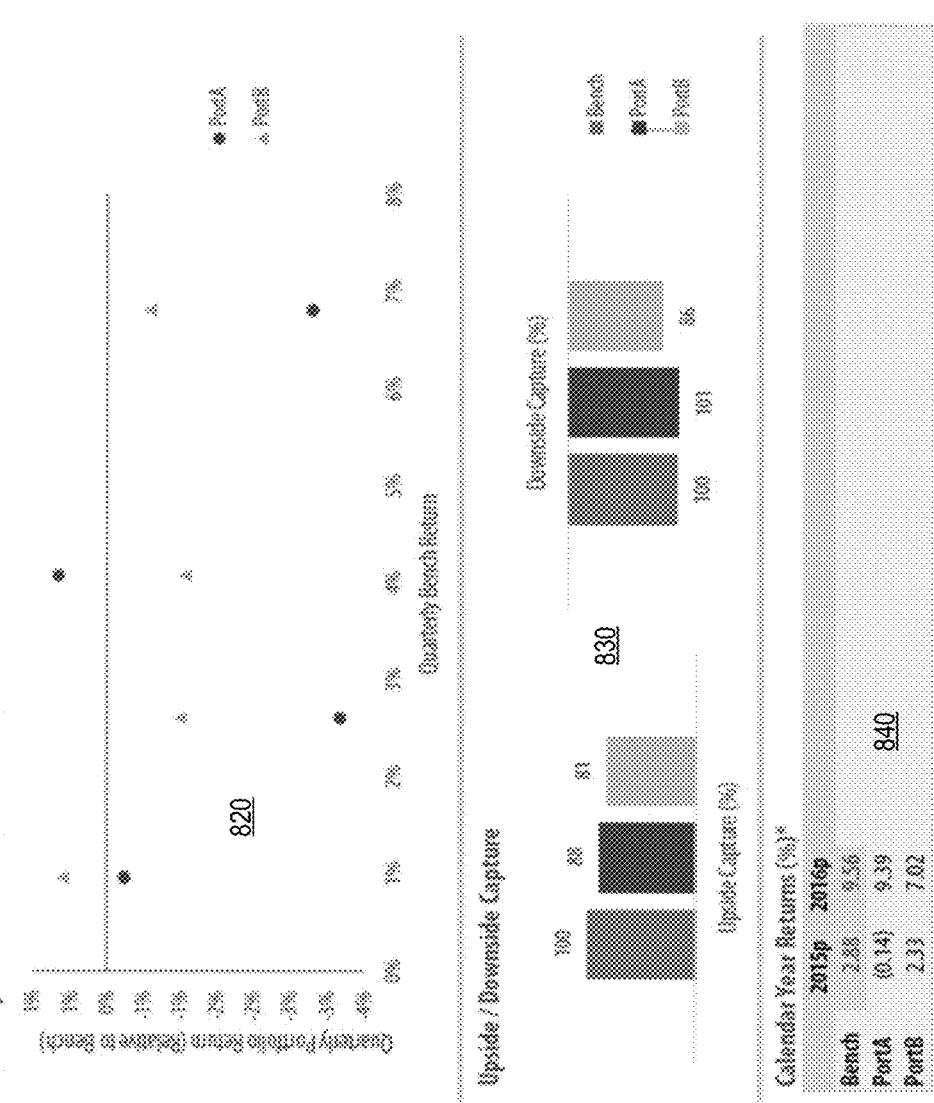
FIG. 8 is an example of a risk and returns characteristics display according to some embodiments.

FIG. 8 is an example of a risk and returns characteristics display 800 according to some embodiments. The display 800 illustrates returns-based risk efficiency and regime persistence including a tabular presentation of a full period summary 810 (e.g., total return, maximum drawdown, relative return, time to recover, etc.) along with graphical presentations of quarterly portfolio return relative to bench data 820 and upside/downside capture data 830. The display 800 further includes calendar year returns 840 for a benchmark and two portfolios. Note that a calendar year followed by a "p" might indicate a partial year based on the start date and/or end date of the analysis.

Note that the allocation of risk may be a fundamental driver of investment outcomes. As such, the success or failure of any investment approach in achieving its objectives might be partially determined by the risk configuration chosen—whether intentionally or not—by the investor. A portfolio's risk configuration, if assessed comprehensively, might be associated with many dimensions, including, for example: which securities are included and their weights; exposure to industry sectors, countries, currencies; and exposure to macroeconomic factors; and exposure to risk premia (e.g., value, size, momentum).

Across this prism of characteristics, a portfolio might be thought of as having a unique "risk allocation DNA." A portfolio's risk genetics might influence important investment characteristics that define a strategy's value, and might be associated with various questions: Are concentrations in individual countries justified by a risk rationale or research insight? Or are they unintentional?; Is the strategy justified in taking idiosyncratic risk in a small number of mega cap names?; What are the portfolio's risk characteristics, (e.g., volatility, correlation), in "normal" times, as well as during stress events?; and What is the likely persistence of excess return potential of the strategy over time—when is the strategy expected to "work"—and when is it likely to underperform?

The prioritization of risk allocation over return seeking may be perceived by industry practitions as reversing the usual order of emphasis. Rather than focusing the majority of research and investment efforts on chasing returns (and benchmarks) over a short time window, such attention might be more productively turned to comprehensively shaping portfolio risk allocation in a manner that best corresponds to outcome objectives.

Figure 9:
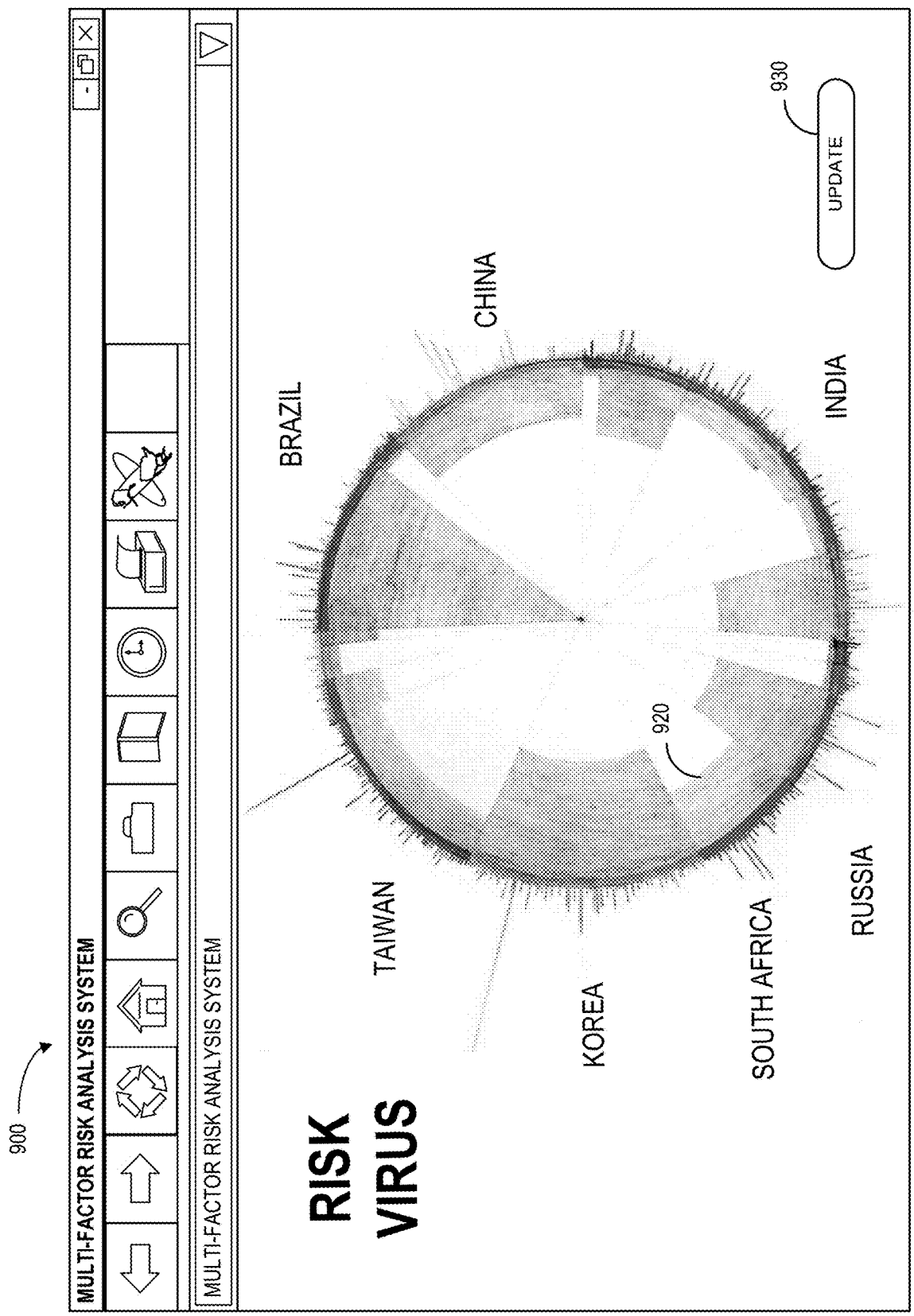
FIGS. 9 and 10 illustrate risk virus displays according to some embodiments.

Consider, for example, an index that visualizes the unintentional risk concentrations and under-representations embedded in a cap-weighted approach to emerging markets. With respect to country concentration, among the two dozen or so typical emerging markets constituent countries, Brazil, Russia, India and China ("BRIC") may represent a substantial percentage index. FIG. 9 illustrates a "risk virus" display 900 according to some embodiments. In particular, the display 900 includes a graphical representation 920 of risk such that:

a graphical area within the circle is associated with an expected tail loss risk contribution for at least one of a country and a currency or other such characteristics (e.g., gray interior shading of ETL);

a graphical length along the circumference of the circle is associated with at least one of an overall country capital allocation and an overall currency capital allocation or other such characteristics (e.g., the country/currency allocation is the length of section in the circumference); and a length of a line extending outside and away from the circle is associated with an allocation to a particular equity or security (e.g., the company allocation is the length of lines extending from exterior of the circle).

According to some embodiments, the display 900 further includes one or more selectable icons 930 (e.g., to request an update of the display 900).

Looking more deeply at the display 900, the substantial allocation to China, South Korea, and Taiwan might create meaningful exposure to the developed market growth cycle, given the export-based nature of these economies. In the case of Brazil, Russia, and South Africa, such concentrations may generate significant exposure to the global commodity cycle. These three countries—in representing concentrated exposure to the Brazilian real, Russian ruble, and South African and may also represent concentration in highly volatile currencies. As a result, this type of concentration could present issues for investors in this asset class.

The display 900 may also indicate another layer of very high concentration in one or just a handful of stocks in many markets. One company in South Korea and another in Taiwan are examples of individual stocks that make up a large percentage of each country's exposure. This might introduce significant idiosyncratic risk that results from concentrated exposure in just a handful of companies and may make the investment subject to company-level risks.

While the multiple levels of concentration may provide examples of unintentional concentration risks and structural biases, the backward-looking bias of market cap-based indexes results in severe underrepresentation of many smaller economies in cap-weighted Emerging Markets ("EM") indexes. Many of these earlier stage countries may represent faster growth potential and better demographics than the larger countries getting the lion's share of the risk allocation.

In strategic beta asset management, a rules-based investment process may seek to improve upon market-cap exposures and returns. Such index-based strategies might include, for example:

fundamental weighting (weighting securities based on fundamental attributes like revenues or earnings);

dividend weighting (weighting securities based on dividends);

factor emphasis (selecting and/or weighting securities based on factor attributes, e.g., value, momentum, size, quality);

volatility (selecting securities or sectors that have exhibited lower volatility in the past); and equal weighting (weighting each security equally, e.g., each stock in a pre-determined number of stock strategy would have a pre-determined percentage position).

Such strategies may provide investors with easy access to intended exposures, however, they also may introduce unintended risks that may not be apparent. Continuing with the emerging markets example, the primary "smart" variants of these new approaches may create unintentional country and currency concentrations and under-representations that match or exceed those of the cap-weighted benchmarks. In other words, investors may be getting more risk than they anticipate.

In another example, unintentional sector bets might not be trivial across strategic beta strategies. This may be particularly true with low volatility strategies, for example, which may emphasize exposures to utilities, consumer staples, and healthcare. When these sectors become expensive relative to their historical norms, valuation risk may result. Such sector concentrations may also introduce a greater degree of sensitivity to interest rates, and potentially greater downside risk in a rising-rate environment.

The systematic risk allocation approaches described herein may generate the following portfolio characteristics relative to the market-cap reference point, while maintaining favorable liquidity:

risk-balanced exposure across countries and currencies, resulting in de-concentration of large country exposures, and greater exposure to smaller, potentially faster-growing countries; and deeper exposure to companies within countries, resulting in less idiosyncratic exposures to large companies, and improved exposure to large and mid-cap companies.

Figure 10:
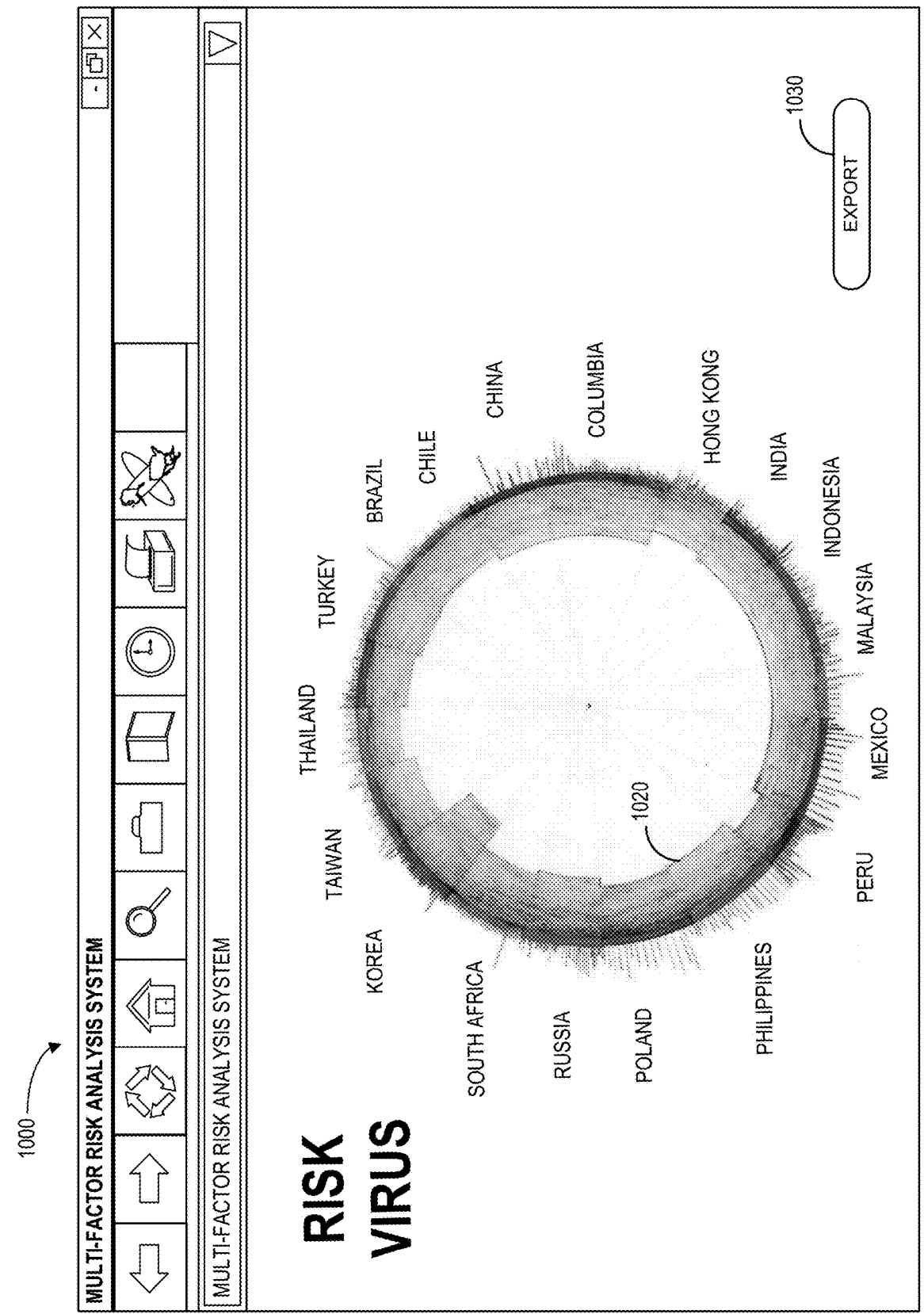

While the multi-factor risk analysis described herein may be systematic and codified into an index to ensure that the desired risk allocation features can be consistently delivered, it might be considered an active approach if "active" is to be interpreted as divergence from the cap-weighted reference index. Note, however, that the active risk taken is largely derived by intentionally shaping a portfolio's risk configuration, with the objective of improving absolute and risk adjusted returns, and providing greater excess return consistency across market regimes. For example, FIG. 10 illustrates a risk virus display 1000 including a graphical representation 1020 that has been risk-balanced according to some embodiments. Note that the display 1000 further includes one or more selectable icons 1030 (e.g., to request an export of the display 1000 data).

Figure 11:
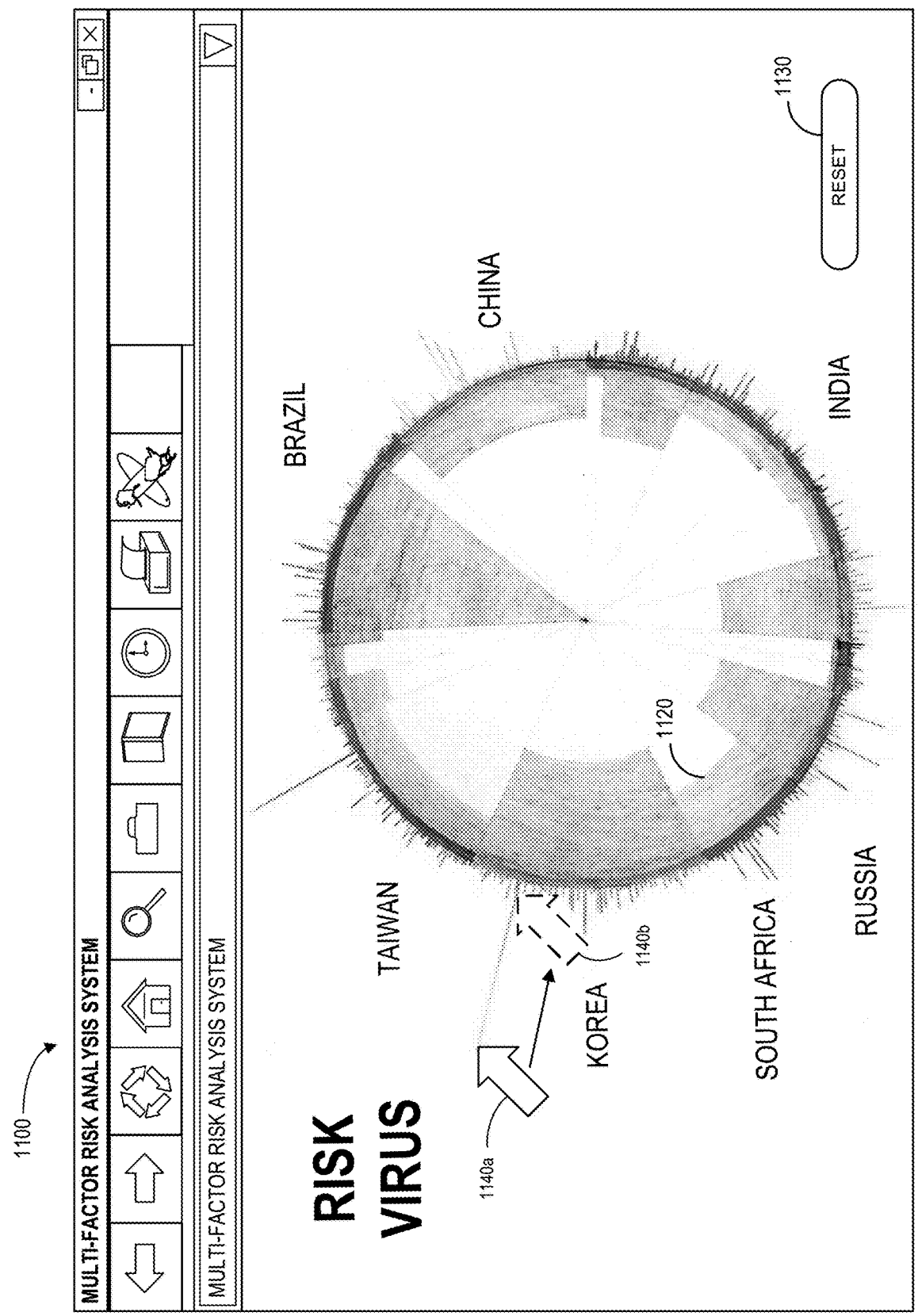
FIG. 11 is an example of interactive risk virus display according to some embodiments.

Investors may focus substantial effort on designing an allocation structure across assets and geographies that seeks superior risk-adjusted returns. This might be considered a portfolio's "macro" risk allocation. At the same time, investors may have an opportunity to further improve portfolio outcomes by likewise focusing attention on "micro" risk allocation—that is, the allocation of risk within the asset classes that comprise a portfolio. It may be important for investors to prioritize taking greater control of risk within each asset class and to seek to optimally harness a thoughtful risk allocation to potentially improve overall portfolio growth. According to some embodiments, users may utilize an interactive risk virus display to dynamically adjust portfolio resources. For example, FIG. 11 illustrates a dynamic risk virus display 1100 in accordance with some embodiments. As before, the display 1100 includes a graphical representation 1120 of resource allocation. According to some embodiments. According to some embodiments, the display 1100 is interactive. For example, a user might select a graphical representation of resource allocation associated with an unusually risky equity associated with Korea using a computer mouse pointer 1140a and "drag" the representation to a second location 1040b (as illustrated by the dashed arrow of FIG. 11). As a result of this action, the system may automatically re-allocate resources such that the overall amount of holdings of that resource is reduced. Note that the display 1100 further includes one or more selectable icons 1130 (e.g., to request that allocations be "reset" to original values).

Figure 12:
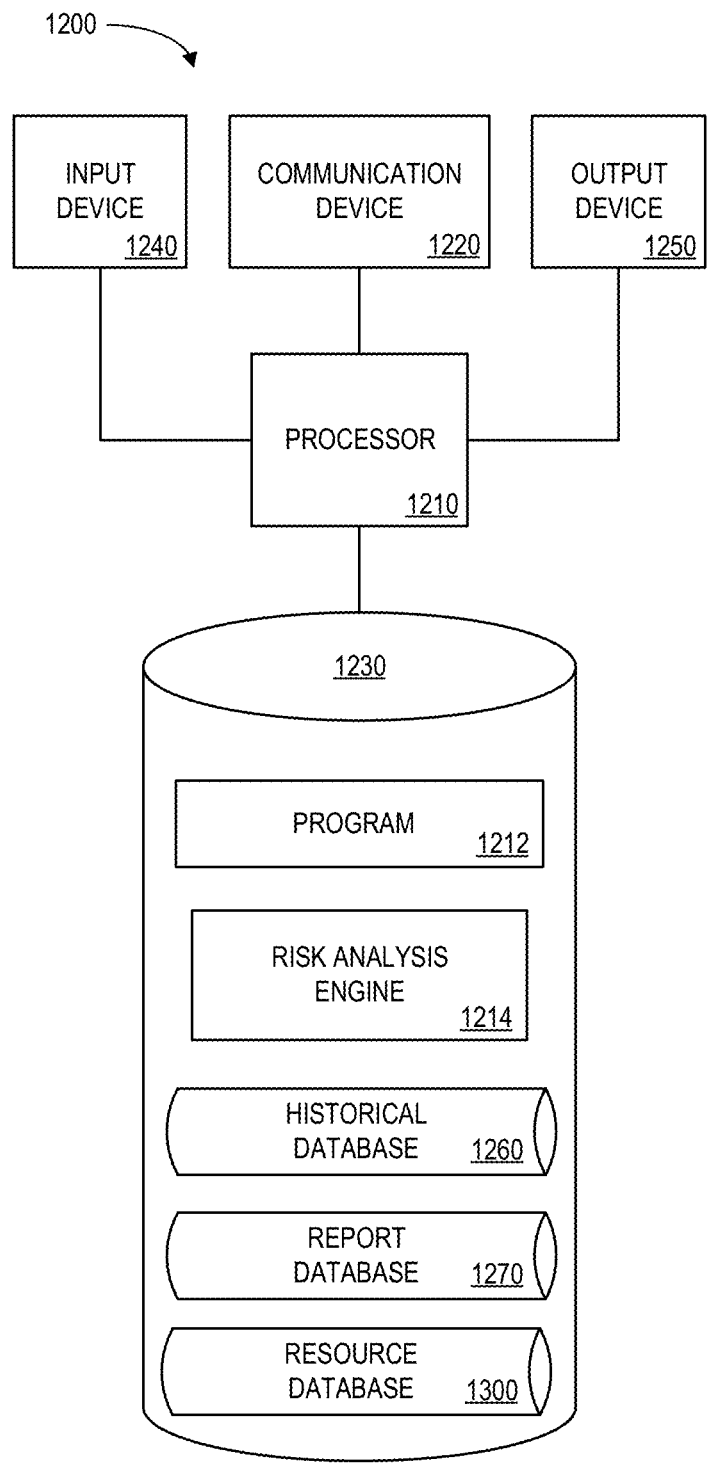
FIG. 12 is a block diagram of an apparatus in accordance with some embodiments of the present invention.

Embodiments described herein may comprise a tool to exchange information directly with users and may be implemented using any number of different hardware configurations. For example, FIG. 12 illustrates a back-end application computer server 1200 that may be, for example, associated with the systems 100, 1400 of FIGS. 1 and 14, respectively. The back-end application computer server 1200 comprises a processor 1210, such as one or more commercially available Central Processing Units ("CPUs") in the form of microprocessors, coupled to a communication device 1220 configured to communicate via a communication network (not shown in FIG. 12). The communication device 1220 may be used to communicate, for example, with one or more remote user devices (e.g., PCs and smartphones), third-party devices, enterprise platforms, etc. Note that communications exchanged via the communication device 1220 may utilize security features, such as those between a public internet user and an internal network of an insurance enterprise. The security features might be associated with, for example, web servers, firewalls, and/or PCI infrastructure. The back-end application computer server 1200 further includes an input device 1240 (e.g., a mouse and/or keyboard to enter information about resources, risk decisions, etc.) and an output device 1250 (e.g., to render user displays, generate reports, etc.).

The processor 1210 also communicates with a storage device 1230. The storage device 1230 may comprise any appropriate information storage device, including combinations of magnetic storage devices (e.g., a hard disk drive), optical storage devices, mobile telephones, cloud storage, and/or semiconductor memory devices. The storage device 1230 stores a program 1212, risk analysis engine 1214, and/or an interface application for controlling the processor 1210. The processor 1210 performs instructions of the program 1212, and thereby operates in accordance with any of the embodiments described herein. For example, the processor 1210 may establish a set of risk parameter diversification objectives and determine a set of eligible resources by accessing the resource data store. The processor 1210 may then calculate a value factor characteristic and a momentum factor characteristic for each of the eligible resources. According to some embodiments, the processor 1210 may also calculate a quality factor characteristic. A set of index resources may be constructed by the processor 1210 from the set of eligible resources based on the risk parameter diversification objective and a risk optimization process utilizing a weighted value factor characteristic and momentum factor characteristic of each resource. An interactive user interface may then be rendered by the processor 1210 including indications associated with the constructed set of index resources.

The program 1212 may be stored in a compressed, uncompiled and/or encrypted format. The program 1212 may furthermore include other program elements, such as an operating system, a database management system, and/or device drivers used by the processor 1210 to interface with peripheral devices.

As used herein, information may be "received" by or "transmitted" to, for example: (i) the back-end application computer server 1200 from another device; or (ii) a software application or module within the back-end application computer server 1200 from another software application, module, or any other source.

In some embodiments (such as shown in FIG. 12), the storage device 1230 further stores a historical database 1260 (e.g., with prior market information), a report database 1270 (e.g., storing reports generated for investors), and a resource database 1300. An example of a database that might be used in connection with the back-end application computer server 1200 will now be described in detail with respect to FIG. 13. Note that the database described herein is only an example, and additional and/or different information may be stored therein. Moreover, various databases might be split or combined in accordance with any of the embodiments described herein. For example, the resource database 1300 and/or historical database 1260 might be combined and/or linked to each other within the program 1212.

Referring to FIG. 13, a table is shown that represents the resource database 1300 that may be stored at the back-end application computer server 1200 according to some embodiments. The table may include, for example, entries identifying a universe of potential resources (e.g., equities or other assets). The table may also define fields 1302, 1304, 1306, 1308, 1310, 1312, 1314 for each of the entries. The fields 1302, 1304, 1306, 1308, 1310, 1312, 1314 may, according to some embodiments, specify: a resource identifier 1302, a current market value 1304, a type 1306, a country 1308, a value factor 1310, a momentum factor 1312, and a quality factor 1314. The resource database 1300 may be created and updated, for example, based on information electrically received from remote user devices, market data, and a multi-factor risk analysis.

The potential relationship request identifier 1302 may be, for example, a unique alphanumeric code identifying a particular equity or asset (e.g., a ticker symbol). The current market value 1304 may represent the price of the resource and the type 1306 might indicate a particular economic sector or industry. The country 1308 might indicate where the resource is located and/or currency associated with the resource. The value factor 1310 might be a weighted value calculated using, for example, an earnings yield, an EBITDA divided by enterprise value, an enterprise value, an operating cash flow divided by enterprise value, a revenue divided by enterprise value, a dividend yield, a book value, etc. The momentum factor might be a weighted value calculated using, for example, a last 10 monthly returns and/or the last 5 monthly returns. The quality factor 1314 might be a weighted value calculated using, for example, a gross profitability divided by a total value of assets.

Thus, embodiments may facilitate a multi-factor risk analysis for a set of resources in an automated, efficient, and accurate manner. This may help streamline communications, reduce the number of messages that need to be exchanged, reduce errors, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
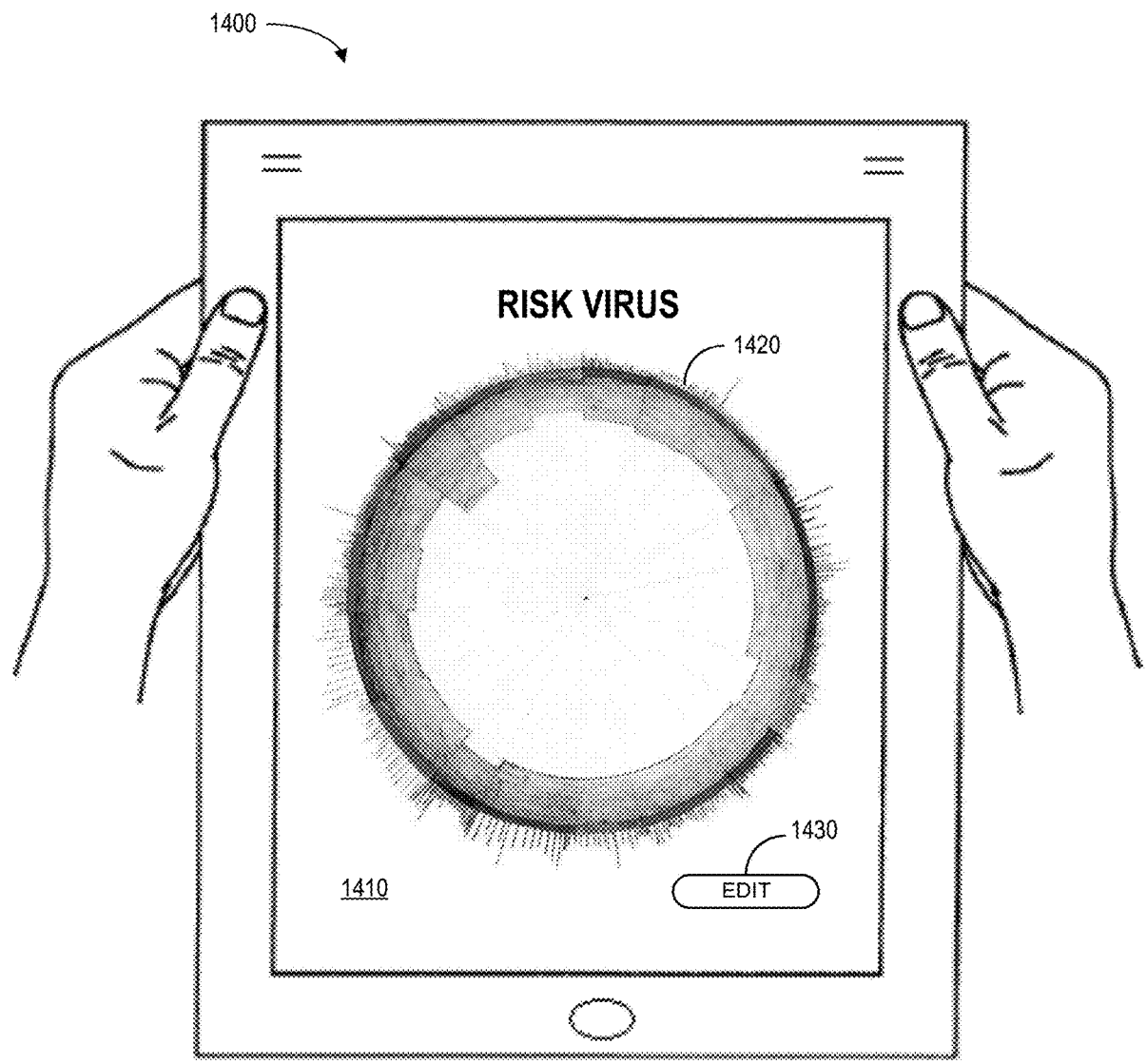
FIG. 14 illustrates a handheld tablet device displaying an initial display according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of assets, embodiments may instead be associated with other types of assets. Still further, the displays and devices illustrated herein are only provided as examples, and embodiments may be associated with any other types of user interfaces. For example, FIG. 14 illustrates a handheld touchscreen tablet computer 1400 with a risk virus display 1410 according to some embodiments. In particular, the display 1410 includes a graphical presentation 1420 of risk characteristics (e.g., a "risk virus"). According to some embodiments, the display 1410 includes a touchscreen that lets a user edit data, receive further details about an item on the display 1410, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computerized method to facilitate a multi-factor risk analysis, comprising:
receiving, by an automated back-end application server computer processor from a remote user device via a communication port and a distributed communication network, a transmitted request for a set of index resources;
responsive to said request, establishing a set of risk parameter diversification objectives;
determining a set of eligible resources by accessing a resource data store, wherein the resource data store contains electronic records defining, for each of a plurality of resources: a resource identifier associated with an entity, a current resource value, a resource type, and a resource location;

calculating a value factor characteristic for each of the eligible resources;

calculating a momentum factor characteristic for each of the eligible resources;

automatically constructing the requested set of index resources from the set of eligible resources based on the risk parameter diversification objective and a risk optimization process utilizing a weighted value factor characteristic and momentum factor characteristic of each resource;

exchanging information with the remote user device via the communication port to render an interactive user interface including indications associated with the requested set of index resources, the value factor characteristics, and the momentum factor characteristics; and automatically generating a plurality of reports including indications associated with the constructed set of index resources, the value factor characteristics, and the momentum factor characteristics, wherein the interactive user interface further includes a circular visualization associated with risk distortions such that:

a graphical area within the circle is associated with an expected tail loss risk contribution based on resource location, a graphical length along the circumference of the circle is associated with at least one of an overall country capital allocation and an overall currency capital allocation, a length of a line extending outside and away from the circle is associated with an allocation to a particular equity or security, and graphical elements of the circular visualization may be interactively adjusted by a user to automatically change resource allocations.

2. The method of claim 1, wherein the risk parameter diversification objectives are associated with at least one of: (i) geographic locations, and (ii) resource types.

3. The method of claim 1, wherein the risk optimization process is further associated with at least one of: (i) factor expression, and (ii) volatility targets.

4. The method of claim 1, wherein the risk optimization process is further adapted to minimize resource turnover.

5. The method of claim 1, wherein said constructing is performed on a periodic basis.

6. The method of claim 1, wherein the resources are associated with at least one of equities and assets, and further wherein the set of index resources comprises a portfolio.

7. The method of claim 6, wherein the value factor characteristic is calculated based at least in part on: (i) an earnings yield, (ii) an Earnings Before Interest, Tax, Depreciation and Amortization ("EBITDA") divided by enterprise value, (iii) an enterprise value, (iv) an operating cash flow divided by enterprise value, (v) a revenue divided by enterprise value, (vi) a dividend yield, and (vii) a book value.

8. The method of claim 6, further comprising:

calculating a quality metric factor characteristic for each of the eligible resources, wherein the optimization process further utilizes the quality metric factor characteristic for each of the eligible resources.

9. The method of claim 8, wherein the quality metric factor characteristic is calculated based at least in part on a gross profitability divided by a total value of assets.

10. The method of claim 6, wherein the set of eligible resources are determined based on at least one of: (i) developed markets, (ii) United States equities, (iii) emerging markets, (iv) global small capitalization equities, and (v) Real Estate Investment Trusts ("REITs").

11. The method of claim 6, wherein the risk parameter diversification objectives are associated with at least one of: (i) countries, (ii) industry sectors, and (iii) property type.

12. The method of claim 11, wherein the risk optimization process is further associated with groups of equities weighted in inverse proportion to risk as indicated by a standard deviation value, variance, estimated tail loss, or other risk measure.

13. The method of claim 6, wherein the risk optimization process is associated with a linear optimization process with an added constraint associated with a targeted maximum estimated portfolio volatility relative to at least one of: (i) a reference benchmark index, and (ii) a market segment performance.

14. The method of claim 13, wherein the estimated portfolio volatility is calculated via a covariance matrix based on returns of portfolio holdings and a relationship of those returns to each other, wherein the covariance matrix is reduced from a size equal to the square of assets in the portfolio to a smaller size.

15. The method of claim 6, wherein the set of risk parameter diversification objectives are associated with at least two of: (i) portfolio risk, (ii) cost risk, (iii) structural risk, (iv) market risk, (v) liquidity risk, and (vi) tax risk.

16. The method of claim 6, wherein the interactive user interface includes information about at least one of: (i) portfolio offensive characteristic, (ii) portfolio defensive characteristics, (iii) risk and return characteristics, and (iv) hypothetical risk and return characteristics.

17. The method of claim 16, wherein the interactive user interface includes, for each of a benchmark set of resources, a first portfolio set of resources, and a second portfolio set of resources, a tabular presentation of at least one of: (i) weighted average portfolio characteristics, (ii) country and sector diversification, and (iii) a full period summary.

18. A non-transitory, computer-readable medium storing instructions, that, when executed by a processor, cause the processor to perform a method to facilitate a multi-factor risk analysis, the method comprising:

receiving, by an automated back-end application server computer processor from a remote user device via a communication port and a distributed communication network, a transmitted request for a set of index resources;

responsive to said request, establishing a set of risk parameter diversification objectives;

determining a set of eligible resources by accessing a resource data store, wherein the resource data store contains electronic records defining, for each of a plurality of resources: a resource identifier associated with an entity, a current resource value, a resource type, and a resource location;

calculating a value factor characteristic for each of the eligible resources;

calculating a momentum factor characteristic for each of the eligible resources;

automatically constructing the requested set of index resources from the set of eligible resources based on the risk parameter diversification objective and a risk optimization process utilizing a weighted value factor characteristic and momentum factor characteristic of each resource;

exchanging information with the remote user device via the communication port to render an interactive user interface including indications associated with the requested set of index resources, the value factor characteristics, and the momentum factor characteristics; and automatically generating a plurality of reports including indications associated with the constructed set of index resources, the value factor characteristics, and the momentum factor characteristics, wherein the interactive user interface further includes a circular visualization associated with risk distortions such that:

a graphical area within the circle is associated with an expected tail loss risk contribution based on resource location, a graphical length along the circumference of the circle is associated with at least one of an overall country capital allocation and an overall currency capital allocation, a length of a line extending outside and away from the circle is associated with an allocation to a particular equity or security, and graphical elements of the circular visualization may be interactively adjusted by a user to automatically change resource allocations.

19. The medium of claim 18, wherein the risk parameter diversification objectives are associated with at least one of: (i) geographic locations, and (ii) resource types.

20. The medium of claim 19, wherein the risk optimization process is further associated with at least one of: (i) factor expression, and (ii) volatility targets.

* * * * *